Figure 1:
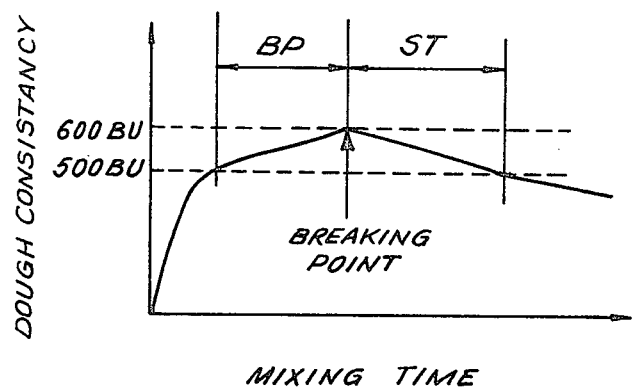

United States Patent [19]

Ohta et al.

[11] Patent Number: 4,478,866
[45] Date of Patent: Oct. 23, 1984

[54] EMULSIFIERS COMPRISING LYSOPHOSPHATIDIC ACID OR A SALT THEREOF AND PROCESSES FOR MAKING A DOUGH CONTAINING SAME

[75] Inventors: Shigenori Ohta; Seijiro Inoue, both of Tokyo; Takaoki Torigoe; Makoto Kobayashi, both of Ibaraki, all of Japan

[73] Assignee: Kyowa Hakko Kogyo Kabushiki Kaisha, Tokyo, Japan

[21] Appl. No.: 419,646

[22] Filed: Sep. 17, 1982

[30] Foreign Application Priority Data

Sep. 18, 1981 [JP] Japan .................. 56-147249

[51] Int. Cl.$^3$ ............... A21D 10/00; C07G 17/00; B01F 17/00
[52] U.S. Cl. .................... 426/549; 426/26; 426/653; 426/662; 435/267; 435/271; 252/356
[58] Field of Search ............ 426/549, 26, 662, 653; 435/134, 267, 271, 131; 252/356, 305, 309, 311, 312

[56] References Cited

U.S. PATENT DOCUMENTS

| | | | |
|---|---|---|---|
| 2,115,088 | 4/1938 | Schwieger | 426/662 |
| 3,652,397 | 3/1972 | Pardun | 426/662 |
| 3,661,795 | 5/1972 | Pardun | 426/356 |
| 4,034,124 | 7/1977 | Van Dam | 426/662 |

FOREIGN PATENT DOCUMENTS 1042709  11/1978  Canada .................. 426/662

*Primary Examiner*—Raymond Jones
*Assistant Examiner*—Elizabeth A. Hatcher
*Attorney, Agent, or Firm*—Wolder Gross & Yavner

[57] ABSTRACT

Lysophosphatidic acid and the physiologically compatible salts thereof possess particularly advantageous properties as emulsifiers for use in foodstuffs and in particular exhibit unexpectedly good results when used in a process for making dough, for use in the production of farinaceous products, in which a wheat flour is mixed with 0.01 to 2.0% by weight (based on the weight of wheat flour) of lysophosphatidic acid or a physiologically compatible salt thereof.

The emulsifiers of the invention comprise a mixture of phospholipids, the mixture comprising lysophosphatidic acid or a physiologically compatible salt thereof in an amount of at least 30 mol %. The emulsifiers may be prepared by treating a mixture of phospholipids with phospholipase D and phospholipase A.

6 Claims, 2 Drawing Figures

RESISTOGRAPHY OF BREAD
(BP AND ST)

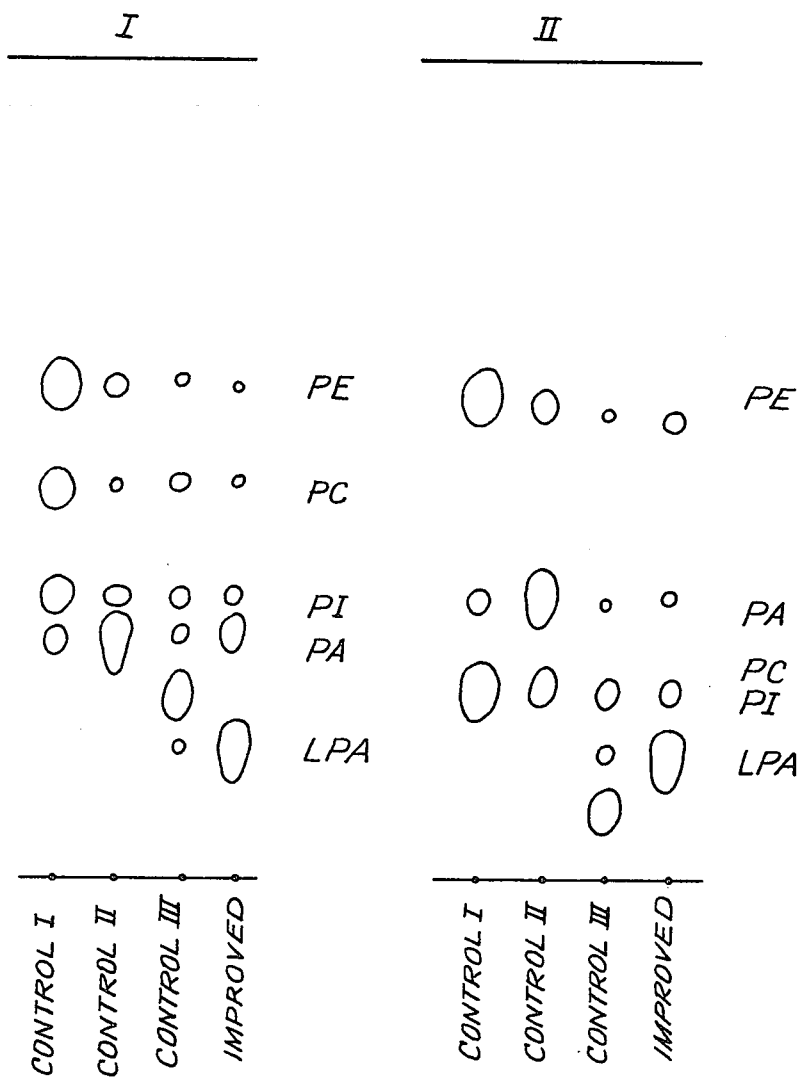

EMULSIFIERS COMPRISING LYSOPHOSPHATIDIC ACID OR A SALT THEREOF AND PROCESSES FOR MAKING A DOUGH CONTAINING SAME

The present invention relates to processes for making a dough for use in the production of farinaceous products and to emulsifiers comprising lysophosphatidic acid or a salt thereof. In particular the dough of the present invention is of interest in view of the improved quality of the farinaceous products, for example bread, obtained therefrom.

Emulsifiers are widely used in the field of processing foodstuffs to promote and stabilize, for example, emulsifying, foaming and wetting operations. In particular, various emulsifiers are widely used for improving the quality of a product for example in the preparation of farinaceous products such as bread in order to control any effects caused by a change in quality of the wheat flour used as main raw material and to stabilize the processing operations.

Typical examples of emulsifiers for foodstuffs such as the agents for improving the quality of bread include soybean lecithin which comprises a mixture of phospholipids such as phosphatidyl choline, phosphatidyl ethanolamine, phosphatidyl inositol, phosphatidic acid and the like [see for example, Fette-Seifen-Anstrichmittel, No. 4, 168 (1979), particularly, Table 2 on page 172]. The term "lecithin" is used herein to mean phosphatidyl choline, but the term "soybean lecithin" is used in a wider sense as indicated above.

It is known that a hydrolysis product may be obtained by treating soybean lecithin with phospholipase A (hereinafter also referred to as PL-A) to hydrolyse off the fatty acid moiety at the $\beta$-position of the lecithin. This hydrolysis product may be used as a milk substitute because of its stronger hydrophilic nature and higher O/W emulsifying activity when compared with lecithin [J. Am. Oil Chemists Soc., 53, 425–427 (1976) & J. Sci. Food Agric., 32, 451–458 (1981)].

It is also known that phosphatidic acid may be obtained by treating soybean lecithin with phospholipase D (hereinafter also referred to as PL-D), and that by using phosphatidic acid in the preparation of bread and pastry, it is possible to improve the physical properties of the dough and the quality of the final product [Czechoslovakian Pat. No. AO-190264 (1979)].

The present invention is based upon the discovery that lysophosphatidic acid and the physiologically compatible salts thereof (hereinafter also referred to as LPA) possess particularly advantageous properties as emulsifiers for use in foodstuffs and, in particular, exhibit unexpectedly good results when used for making a dough by virtue of the good tolerance to mechanical handling of the dough and by virtue of the improved quality of the farinaceous products, especially bread obtained therefrom.

Thus according to one feature of the present invention there is provided a process for making a dough for use in the production of farinaceous products, characterized in that a wheat flour is mixed with 0.01–2.0% by weight (based on the weight of wheat flour) of lysophosphatidic acid or a physiologically compatible salt thereof.

The process is conveniently effected by the use of lysophosphatidic acid in the form of its sodium or calcium salt.

The wheat flour used in the process of the present invention, for example, may itself be in the form of a dough or sponge.

The lysophosphatidic acid or physiologically compatible salt thereof is preferably used in the form of an emulsifier for foodstuffs, said emulsifier comprising a mixture of phospholipids in which lysophosphatidic acid or a physiologically compatible salt thereof is present in an amount of at least 30 mol %. The lysophosphatidic acid or physiologically compatible salt thereof is advantageously obtained by treating a mixture of phospholipids with phospholipase D and phospholipase A. The phospholipid mixture is preferably treated first with phospholipase D and then with phospholipase A. Where the phospholipid mixture is rich in phosphatidic acid, however it may be convenient to treat the phospholipid mixture simultaneously with phospholipase D and phospholipase A.

The mixture of phospholipids employed advantageously comprises soybean lecithin, cotton seed lecithin and/or rapeseed lecithin, but is preferably soybean lecithin.

The dough of the present invention comprises wheat flour in admixture with 0.01–2.0% by weight (based on the weight of wheat flour) of LPA and is preferably used to obtain a farinaceous product such as bread. If desired however the dough may be marketed in a form suitable for use at a later date. Thus, for example it may be convenient to market the dough such that the consumer may for example bake it into bread after purchase.

According to a further feature of the present invention there is provided an emulsifier for foodstuffs e.g. for use in the preparation of dough and/or farinaceous products such as bread which comprises a mixture of phospholipids said mixture comprising lysophosphatidic acid or a physiologically compatible salt thereof in an amount of at least 30 mol %.

LPA is capable of promoting the emulsification of fats and oils in water to form a stable emulsion. This substance is also capable of promoting the foaming of various foodstuffs to provide stable foams. When LPA is added to a wheat flour used for the preparation of sponge or dough, the sponge or dough thus-obtained has an excellent tolerance to mechanical handling and the use of such a dough provides a final product having excellent texture and a pleasant feel. Farinaceous products e.g. bread having improved qualities may be obtained by using this substance even when a wheat flour of lower grade or a wheat flour mixed with other grain flours is used.

The effects of LPA are exemplified in the following Table 1 which indicates the improved physical properties of dough which may be obtained by the use of LPA. These physical properties are evaluated by conventional resistography.

TABLE 1

| Improved physical properties of dough obtained by the use of LPA | | |
|---|---|---|
| Sample | BP (min.) | ST (min.) |
| Control (not added) | 7.5 | 5.4 |
| LPA 0.15% (w/w) | 9.0 | 9.0 |
| 0.30% (w/w) | 10.5 | 11.0 |
| 0.50% (w/w) | 12.5 | 13.0 |

In the above Table 1 LPA is used in the form of its sodium salt and is prepared as hereinafter described in Example 3. The weight of LPA added to the dough is indicated by % (w/w) in the Table and is a percentage based on the weight of wheat flour used.

The terms BP and SP used in Table 1 mean respectively the period of time before commencement of breakage of the dough and the period of time in which the stability of the dough is maintained. The BP and ST indicate the degree of tolerance of the dough to mechanical handling and the meaning of the terms BP and ST is further illustrated in FIG. 1 in which dough consistency in Brabender units (BU), is plotted against mixing time. The BP is the time taken for the dough consistency to pass from 500 BU to the breaking point (B). At the breaking point the water content of the dough is adjusted to 600 BU and the ST is the time taken for the dough consistency to pass from the breaking point (600 BU) to 500 B.U..

As will be seen from Table 1 the BP and ST are significantly extended by the addition of LPA. When soybean lecithin, is mixed with wheat flour in an amount of 0.15-0.5% (w/w) however no significant change in BP and ST is found. LPA or a mixture of phospholipids containing a high proportion of LPA e.g. at least 30 mol % is thus more effective as an improving agent in the preparation of dough and/or farinaceous products such as bread than other phospholipids.

According to a further feature of the present invention there is provided a process for preparing an emulsifier for foodstuffs which comprises a mixture of phospholipids said mixture comprising lysophosphatidic acid or a physiologically compatible salt thereof in an amount of at least 30 mol % said process comprising the treatment of a mixture of phospholipids with phospholipase D and phospholipase A and formulating the product thereby obtained into an emulsifier as hereinbefore defined.

The term "mixture of phospholipids" or "phospholipid mixture" as used herein preferably means soybean lecithin, cotton seed lecithin and/or rapeseed lecithin which contain phosphatidyl choline, phosphatidyl ethanolamine phosphatidyl inositol, phosphatidyl serine (PS), and phosphatidic acid, etc., as is shown in Table 2 hereinafter.

Although it is possible to use, for example, cotton seed lecithin and rapeseed lecithin for the purpose of the present invention it is preferred to use soybean lecithin which is widely used for processing foodstuffs. Table 2 indicates examples of the composition of commercially available soybean lecithins.

TABLE 2

| Sample No. | Compositions of soybean lecithin of market grade |  |  |  |  |  |
|---|---|---|---|---|---|---|
|  | PC | PE | PI | PS | PA | Lysophospholipids (mol %) |
| 1 | 41 | 34 | 19 | — | 6 | — |
| 2 | 34 | 10 | 29 | — | 12 | 15 |
| 3 | 33 | 29 | 24 | — | 14 | — |
| 4 | 45 | 19 | 11 | 25 | — | — |
| 5 | 11 | 19 | 41 | — | 29 | — |
| 6 | 33 | 32 | 21 | — | 14 | — |

Source: Fette Seifen Anstrichmittel, Vol. 81. No. 4, page 168 (1979)

Table 2 indicates that phosphatidyl choline (PC), phosphatidyl ethanolamine (PE) and phosphatidyl inositol (PI) are the main constituents and the amount of lysophospholipids is low. Phosphatidic acid (PA) is a known compound in soybean lecithin, and is converted into LPA by the action of PL-A.

It will be appreciated that the term "lysophospholipids" used in Table 2 is a generic term covering for example compounds of the formula:

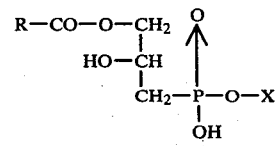

wherein X represents inositol, hydrogen, choline or ethanolamine. Thus the term "lysophospholipids" is a generic term covering for example a mixture of inter alia lysophosphatidyl inositol, lysophosphatidyl choline and lysophosphatidyl ethanolamine, lysophosphatidic acid merely being one component of the mixture. Thus, for example, even when the soybean lecithin having the highest phosphatidic acid content is used the resultant LPA content on using PL-A alone cannot be more than 30 mol %, even on the assumption that the yield of LPA is 100%.

When the soybean lecithin is treated, however, with PL-D to increase the PA content and is then treated with PL-A according to the present invention, it is possible to obtain a mixture of phospholipids containing more than 30 mol % of LPA, as is shown in the following:

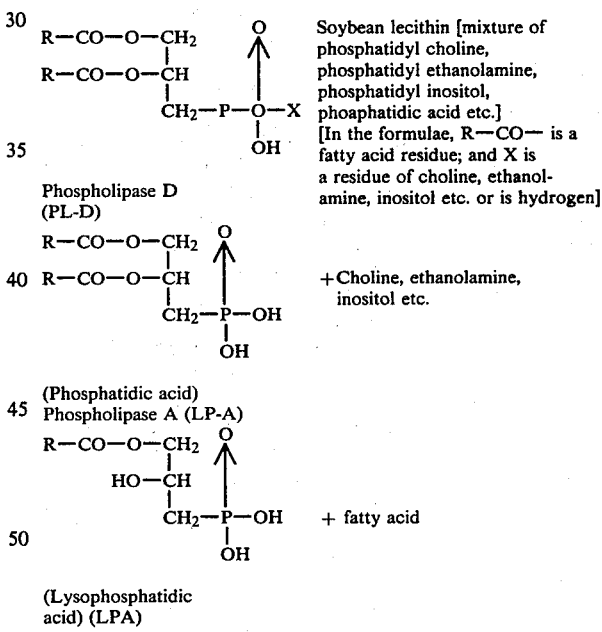

When the lecithin mixture used is rich in PA, it is possible to obtain a mixture of phospholipids containing a large amount of LPA by treating the mixture simultaneously with PL-D and PL-A. However, it is preferred to effect the PL-D treatment, followed by the treatment with PL-A, because the PA content in the phospholipid mixture is, in general, not sufficiently high to render simultaneous treatment advantageous.

The process of preparing LPA or a phospholipid mixture containing at least 30 mol % LPA is explained in detail below:

(1) Raw material:

Phospholipids are widely present in animals and plants and particularly rich in, for example, soybeans, cotton seeds, rapeseeds, and egg, from which various phospholipid mixtures may be obtained and used as raw materials for the present invention. Soybean lecithin is most advantageous because it is cheaper and a large amount of soybean lecithin may be obtained commercially. Typical compositions of soybean lecithin are shown in Table 2 detailed hereinbefore.

Phospholipase D (LP-D) is widely found in plants such as, for example, carrot and cabbage, from which an extracted solution having high enzymatic activity may be obtained. The enzymatic reaction is conveniently effected in the presence of calcium ions. Any convenient soluble calcium salt may be used for this purpose such as the chloride or lactate.

Phospholipase A (PL-A) is widely present in animals. In particular, a high activity of PL-A is found in the pancreas of mammals and thus it is possible to use pancreatin originating from cattle or pigs. In certain cases, however a pre-treatment as discussed hereinafter may be needed to remove lysophospholipase from pancreatin, which may be present as an impurity and may decompose the desired lysophospholipid.

In order to promote the dispersion of lecithin and pulverize the reaction product, it is preferred to effect the enzymatic reaction in the presence of wheat flour and/or skim milk powder etc.

(2) PL-D reaction:

In order to effect the PL-D reaction, the phospholipid mixture such as soybean lecithin is conveniently used in the form of an aqueous dispersion. The dispersion is usually obtained mechanically, although the phospholipid mixture in pure form is readily soluble in water. Such a dispersion is prepared, for example, by using a high speed rotary homogenizer or by ultrasonic treatment. Any convenient concentration of the raw phospholipid mixture in the reaction solution may be employed which allows the reaction to proceed sufficiently and renders the reaction easy to operate. A preferred concentration is however 5-15% w/w. If desired skim milk powder and/or wheat flour may be used, for example, to promote the dispersion of the phospholipids. By using such dispersing agents, the separation of the phospholipids during the reaction may be suppressed and moreover a dry powder may be obtained more easily after the reaction.

The amount of PL-D added should be enough to carry out the desired reaction in the reaction solution. As the enzyme source, it is preferred to use a vegetable juice containing a high PL-D activity, because it may be difficult to obtain a suitable preparate of PL-D on an industrial scale. For example, a carrot or cabbage juice (10-300 parts) prepared by grinding and pressing may be used to treat a phospholipid mixture (100 parts).

Calcium ions are generally employed to effect the enzymatic reaction, and the concentration of Ca ions used may vary within wide limits preferably from 20 to 200 mM.

The reaction rate is enhanced by an increase in temperature providing of course that the enzyme is not thereby inactivated. A temperature of 30°-40° C. is preferred where carrot or cabbage juice is used as the source of PL-D.

The reaction may be effected over a wide pH range. When carrot or cabbage juice is used as the source of PL-D, a pH of 5-8 is preferred.

The preferred reaction time may vary from 2-20 hours depending on different conditions such as the concentration of phospholipid, the degree of dispersion, the amount of the enzyme used, pH and the like.

(3) PL-A reaction:

After completion of the PL-D reaction, the reaction solution is treated with PL-A to effect the second reaction. The amount of PL-A added should be sufficient to convert the phospholipid mixture (containing PA as main constituent and obtained by the PL-D reaction) into another phospholipid mixture contained lyso-PA. When a pancreactin powder originating from the pig is used, it is preferred to add an amount of 0.5-5 % (w/w) to the phospholipid mixture used as starting material.

The pH of the reaction solution is preferably within the same pH range as that used in the first reaction and the reaction time may be the same as the time" for the first reaction.

As the heat stability of PL-A is in general better than the stability of PL-D, the reaction may be carried out at a higher temprature (for example, at 50° C.), although it is possible to use the same temperature as the temperature of the first reation.

After this, the reaction solution may be used for the purpose of the present invention, although it is possible, if desired, to concentrate the solution to give a paste. It is also preferred to add a suitable additive for making powders, such as, for example, wheat flour and sugars to the reaction solution, followed by drying to obtain powders which may easily be preserved and handled. Any convenient method of drying, for example, spray-drying, freeze-drying etc., may be used.

It is possible to extract LPA and/or a phospholipid mixture containing a high concentration of LPA from the reaction solution for example, by subjecting the dehydrated concentrate of the reaction solution or its dried powder to suitable solvent extraction, and the thus separated LPA or purified mixture of phospholipids may be used with or without mixing with suitable materials for foodstuffs such as, for example, oils, fats and other emulsifiers. The ratio of mixing with other materials may vary within a wide range, depending upon the uses and conditions envisaged for the product, and may be, for example, more than 1 % (w/w) as a phospholipid mixture.

The above explanation relates to the situation in which the PL-D reaction is effected at first and the PL-A reaction is effected afterwards. This situation will perhaps be the most commonly used embodiment.

When, however, the starting phospholipid mixture such as soybean lecithin is rich in PA, it is possible to increase the amount of LPA mixture by carrying out the enzymatic reactions at the same time. In this case, the required conditions are similar to those hereinbefore described.

LPA or a phospholipid mixture containing a high concentration (at least 30 mol) LPA according to the present invention may with advantage be used for improving the quality of dough and in particular farinaceous products such as bread produced therefrom.

Various advantages which may be obtained by using the emulsifier of the present invention in the preparation of bread are as follows.

(1) Improved physical properties of the dough:

When LPA or a phospholipid mixture containing at least 30 mol % LPA of the present invention is added to a dough, an improved tolerance to mechanical handling, good processability, suitable resiliency, high stretchability and lower adherence may be obtained.

The improved properties of the doughs obtained by using LPA are shown in Table 1 hereinbefore.

(2) Improved quality of the final products:

When LPA or a phospholipid mixture containing at least 30 mol % LPA is added to the material for the preparation of bread, the bread thus obtained exhibits various advantages such as, for example, an increase in volume; crumb with stretched, thin film-like structure; improved soft touch and inhibition of staling.

LPA or a phospholipid mixture containing at least 30 mol % LPA may be added to the flour in the preparation of the sponge or at the time of dough mixing.

The amount of the phospholipid mixture added is preferably 0.2–0.5% (w/w) on the basis of the weight of wheat flour used, although it is possible to change the amount, depending upon various factors such as, for example, the type of bread to be prepared, the composition of the raw materials, the preparation method and the like, for example, within a range of from 0.05 to 5.0 % (w/w). In the case of purified LPA, the added amount may be smaller than the corresponding amount of the said phospholipid mixture containing at least 30 mol % LPA and may be, for example, from 0.01 to 2.0 % (w/w). LPA may be used in the form of free acid or salt (for example, sodium salt, calcium salt and the like).

By way of example the steps employed for the making of bread may include the following:

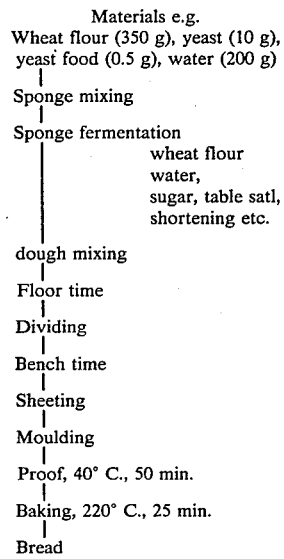

The following non-limiting examples illustrate the present invention.

EXAMPLE 1

Soybean lecithin paste (AY Lecithin paste, commercial product of Honen Seiyu K. K., Japan) was used as the phospholipid mixture (900 g) and was dispersed in water (3600 g) by using a high speed rotary homogenizer. To this dispersion was added skim milk powder (450 g) [commercial product of Yuki Jirushi Nyugyo K. K., Japan] to promote the dispersion. After this, carrot juice (900 g), which had been separately prepared by grinding and pressing carrots, and 2M calcium-chloride aqueous solution (300 ml) were added to the dispersion which was allowed to stand at a pH of 6.5 and at a temperature of 30° C. for 4 hours to carry out the enzymatic reaction.

Then pancreatin (commercial product of Miles Laboratories, Ins., U.S.A.) was used as the PL-A enzyme source, a 5% (w/w) solution (180 g) of which was adjusted to a pH of 4.0 with 2N HCl, heated at 90° C. for 30 minutes and cooled. The enzyme solution was added to the reaction solution and heated at 50° C. for 16 hours to carry out the second enzymatic reaction. After this, the reaction solution was heated at 90° C. for 30 minutes in order to sterilize the solution. Skim milk powder (450 g) was added as a dispersant in order to promote the preparation of the emulsifier in the form of a powder. After this, the dispersion was spray-dried to yield the emulsifier for foodstuffs in the form of a powder (about 1.8 kg) containing 43 % (w/w), on the basis of the starting phospholipids.

Phospholipids were extracted from the thus-obtained powders in conventional manner (see D. Abramson & M. Blecher: J. Lipid Research, 5. 628 (1964)) and the composition of the powders was determined by thin layer chromatography to give the results shown in Table 3, from which the high LPA content is apparent in the improved soybean lecithin.

TABLE 3

| Composition of soybean lecithin containing LPA (mol %) | | |
|---|---|---|
| | Starting lecithin | Improved Lecithin |
| P C | 31 | 2 |
| P E | 27 | 7 |
| P I | 25 | 13 |
| P A | 6 | 7 |
| LPA | 0 | 40 |
| Other | 11 | 26 |

EXAMPLE 2

(1) Preparation of an improved soybean lecithin:

Soybean lecithin powder (commercial product of Tsuru Lecithin Kogyo K. K., Japan) was used as the starting soybean lecithin, from which Control sample I (untreated soybean lecithin), Control sample II (treated with PL-D), Control sample III (treated with PL-A) and a sample of the improved soybean lecithin of the present invention were respectively prepared by using the constituents shown in Table 4 in the proportions shown.

TABLE 4

| Reaction composition for treating soybean lecithin A . . . Soybean lecithin (g); B . . . water (ml); C . . . calcium chloride solution (ml); D . . . carrot extract (ml); E . . . pancreatin (g) | | | | | |
|---|---|---|---|---|---|
| Sample | A | B | C | D | E |
| Control I | 100 | 1,600 | 80 | 0 | 0 |
| Control II | 100 | 1,400 | 80 | 200 | 0 |
| Control III | 100 | 1,600 | 80 | 0 | 2 |
| Present invention | 100 | 1,400 | 80 | 200 | 2 |

(notes)
(1) C . . . 1M aqueous solution of calcium chloride.
(2) D . . . An equal amount of water was used to prepare carrot juice which was then filtered through gauzes.
(3) E . . . pig pancreatin (commercially available from Tokyo Kasei K.K., Japan) was used to prepare an aqueous solution [5% (w/w); pH 4.0] which was sterilized before use by heating at 85° C. for 30 minutes.

The samples were prepared as follows.
Control sample I:

Soybean lecithin powder was added to water and was dispersed by using a high speed rotary homogenizer to obtain a dispersion. After the addition of calcium chloride, the dispersion was heated at a temperature of more than 90° C. for 20 minutes. Then the dispersion was treated with lactose 100 g [Commercial product of De Meijerij Veghel, Nederland] to promote powder formation, followed by freeze-drying to obtain the powder.

Control sample II:

A reaction solution was prepared in a similar manner to that described above, and carrot extract was then added. The mixture was kept at a pH of 6.5 and at a temperature of 37° C. for 6 hours to effect the PL-D reaction. After this, the reaction solution was treated in a similar manner to that described above.

Control sample III:

A reaction solution was prepared in a similar manner to that described above, and the pancreatin dispersion was then added. The reaction was effected at a pH of 6.5 and at a temperature of 37° C. for 6 hours. After completion of the PL-A reaction, the solution was treated in a similar manner to that described above.

Sample of the present invention:

The PL-D reaction of the starting material was effected in a similar manner to that employed to effect the preparation of Control sample II, and the PL-A reaction and after-treatment was then effected in a similar manner to that employed in the preparation of Control sample III to obtain a sample of improved soybean lecithin powder.

The differences between the chemical composition of the control samples and the composition of the sample of the improved soybean lecithin are apparent from the results of thin layer chromatography shown in the accompanying drawing (FIG. 2).

In FIG. 2, PE, PC, PI, PA and LPA are as hereinbefore defined and CI, CII, CIII and Imp mean respectively Control I, Control II, Control III and Improved phospholipid mixture of the present invention. The headings I and II represent the solvent systems used.

The chromatograph was effected under the following conditions:

Sample solution:

To the sample powder (1 g), a solution of chloroform/methanol (2:1; 10 ml) and phosphoric acid (0.2 ml) were added. The solution was shaken for 30 minutes and filtered to obtain an extracted solution. Each 4 μl of this solution was used to form a spot on each occasion.

Plate: Silica gel 60, No. 5721 (commercial product of E. Merck AG., West Germany)

Solvent system:
I....chloroform/methanol/28% ammonia/water (65:30:5:25)
II...chloroform/methanol/water (65:25:3)

Colour reaction:

Phospholipids alone were coloured blue by spraying a reagent conventionally used to detect phospholipids (molybdenum blue reagent).

Control sample 1 (untreated starting material) containing large amounts of PE, PC and PI; control sample II contains mainly PA, and control sample III contains lysophospholipids originating from the starting material.

The sample of soybean lecithin improved by the process of the present invention however, contains a large amount of LPA (about 50% of all phospholipids as shown in Table 5 below:

TABLE 5

|  | Control | | | Improved |
|---|---|---|---|---|
|  | I | II | III |  |
| PC | 32 | 7 | 3 | 2 |
| PE | 26 | 13 | 3 | 4 |

TABLE 5-continued

|  | Control | | | Improved |
|---|---|---|---|---|
|  | I | II | III |  |
| PI | 24 | 21 | 22 | 21 |
| PA | 6 | 47 | 0 | 2 |
| LPC | 0 | 0 | 29 | 5 |
| LPE | 0 | 0 | 24 | 11 |
| LPA | 0 | 0 | 6 | 42 |
| Others | 12 | 12 | 13 | 13 |

Unit ... mole
LPA ... Lyso-PA
LPC ... Lyso-P choline
LPE ... Lyso-P ethanolamine (2) Baking test:

The test samples shown in Table 6 were prepared by using the samples of phospholipid mixtures hereinbefore described in (1).

TABLE 6

| Samples for baking test | |
|---|---|
| Sample No. | Additive |
| I | No additive |
| II | Control sample I |
| III | Control sample II |
| IV | Control sample III |
| V | Improved phospholipid mixture of the present invention |

Wheat flour [Yoto, commercial product of Nippon Seifun K. K., Japan] (359 g), baker's yeast [Pressed Yeast, commercial product of Kyowa Hakko Kogyo K. K., Japan] (10 g), yeast food containing ascorbic acid [Yeast food, Pandia, PC-200, commercial product of Kyowa Hakko Kogyo K. K., Japan] (0.5 g) and water (200 g) were used to prepare a sponge, to which the wheat flour [Yoto, commercial product of Nippon Seifun K. K., Japan] (150 g), sugar (25 g) table salt (10 g) shortening [shortening, Chester 77, commercial product of Asahi Denka K. K., Japan] (25 g) and water (140 ml) were added at the time of dough mixing.

All bread samples were prepared in conventional manner, and on each occasion, a test sample of the phospholipid mixture was added to the wheat flour at the time of preparing the sponge in an amount of 0.4 % (w/w).

Table 7 indicates the physical properties of the dough and the quality of the thus prepared bread (determined 2 days after preparation).

TABLE 7*

|  | Evaluation | | | | |
|---|---|---|---|---|---|
|  | Sample No. | | | | |
|  | I | II | III | IV | V |
| Physical properties of dough | | | | | |
| Elasticity | Y | X | X | X | X |
| Extensibility | Z | Z | X | X | W |
| Non-adherence | Z | Z | X | X | W |
| Quality of bread | | | | | |
| Volume** | Z | Z | X | X | X |
| Stretchability of crumb | Z | Z | X | X | W |
| Lustre of crumb | Z | Z | X | X | W |
| Flavour | Y | Y | Y | Y | Y |

TABLE 7*-continued

| | Evaluation | | | | |
|---|---|---|---|---|---|
| | Sample No. | | | | |
| | I | II | III | IV | V |
| Soft touch | Z | Z | X | W | W |

Note:
W Very good
X Good
Y Normal
Z No good
*... The specific volume was measured by the rapeseed displacement method (conventional method). Other items were determined by using a panel consisting of 5 experts.
**... I-4.86; II... 4.88; III.. 5.03; IV.. 5.06; V.. 5.08 (by the rapeseed method)

The phospholipid mixtures treated with PL-D or PL-A gave better resuls for improving the quality of the bread when compared with the untreated soybean lecithin, but the best results were obtained by using the improved soybean lecithin prepared by the process of the present invention.

EXAMPLE 3

The improved soybean lecithin containing a large amount of lecithin of Example 1 in powder form (320 g) extracted three times with a mixture of chloroform/methanol (2:1; each 640 ml). The residue was extracted twice with a mixture of chloroform/methanol/phosphoric acid (2:1:0.15; each 640 ml). The resultant extracted solution containing LPA was neutralized with 10 N caustic soda. The sodium phosphate thus-formed was separated from the solution by filtration. After dehydration with anhydrous sodium sulphate, the reaction solution was concentrated to about 100 ml, and acetone (500 ml) was added to the concentration solution to give precipitates of the sodium salt of LPA. The precipitates were separated, washed with acetone and dried in vacuo to yield the sodium salt of LPA having a purity of about 95% (20 g). The results shown hereinbefore in Table 1 are obtained by determining the thus-obtained LPA in conventional manner by using resistography. This table indicates that LPA is capable of greatly improving the tolerance of the dough to mechanical handling.

Test breads were pepared by using the LPA thus-obtained as follows. LPA was added to wheat flour in an amount of 0.2% (w/w) and the materials were then treated in a similar manner to that described in Example 2. When compared with the results obtained by using untreated soybean lecithin the dough prepared by using the wheat flour containing the LPA prepared in this example had good elasticity and stretchability and were easily handleable. The bread obtained using such dough had increased volume and crumb with well stretched, thin film-like structure, uniformity and soft touch, which represent excellent products. The overall results obtained were superior to the results obtained by the mixture of Example 2.

We claim:

1. A process for making a dough for use in the production of farinaceous products which comprises mixing a wheat flour with 0.01–2.0% by weight based on the weight of wheat flour of lysophosphatidic acid or a physiologically compatible salt thereof obtained by treating a mixture of phospholipids with phospholipase D and phospholipase A.

2. A process as claimed in claim 1 in which the lysophosphatidic acid or physiologically compatible salt thereof is used in the form of an emulsifier for foodstuffs, said emulsifer comprising a mixture of phospholipids in which lysophosphatidic acid or a physiologically compatible salt thereof is present in an amount of at least 30 mol %.

3. A process as claimed in claim 2 wherein the mixture of phospholipids comprises soybean lecithin, cotton seed lecithin and/or rapeseed lecithin.

4. A process for preparing an emulsifier for foodstuffs comprising a mixture of phospholipids containing lysophosphatidic acid or a physiologically compatible salt thereof in an amount of at least 30 mol percent, which process comprises treating a mixture of phospholipids with phospholipase D and phospholipase A, and formulating the product thus obtained into said emulsifier.

5. A process as claimed in claim 4 wherein the phospholipid mixture is treated first with phospholipase D and then with phospholipase A.

6. A process as claimed in claim 4 wherein the mixture of phospholipids comprises soybean lecithin, cotton seed lecithin and/or rapeseed lecithin.

* * * * *